July 23, 1935.  C. D. FATOR  2,008,693
SIGNALING SYSTEM
Filed Nov. 28, 1931  2 Sheets-Sheet 1
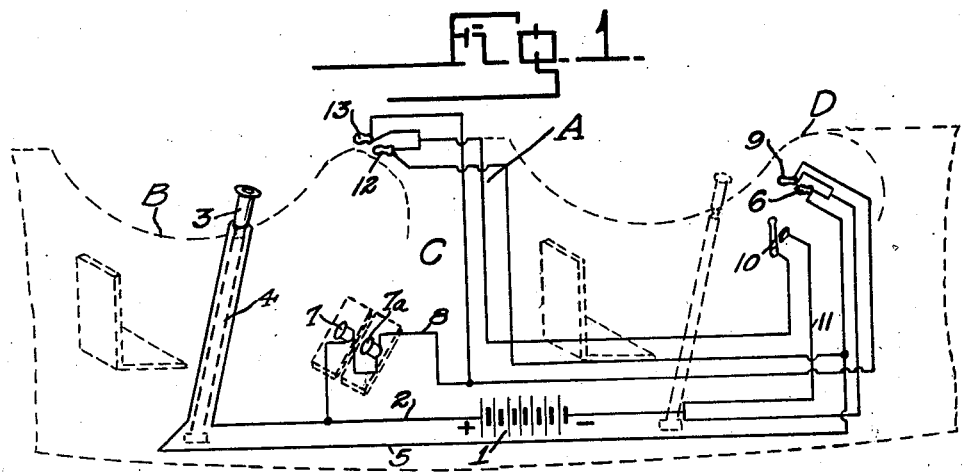
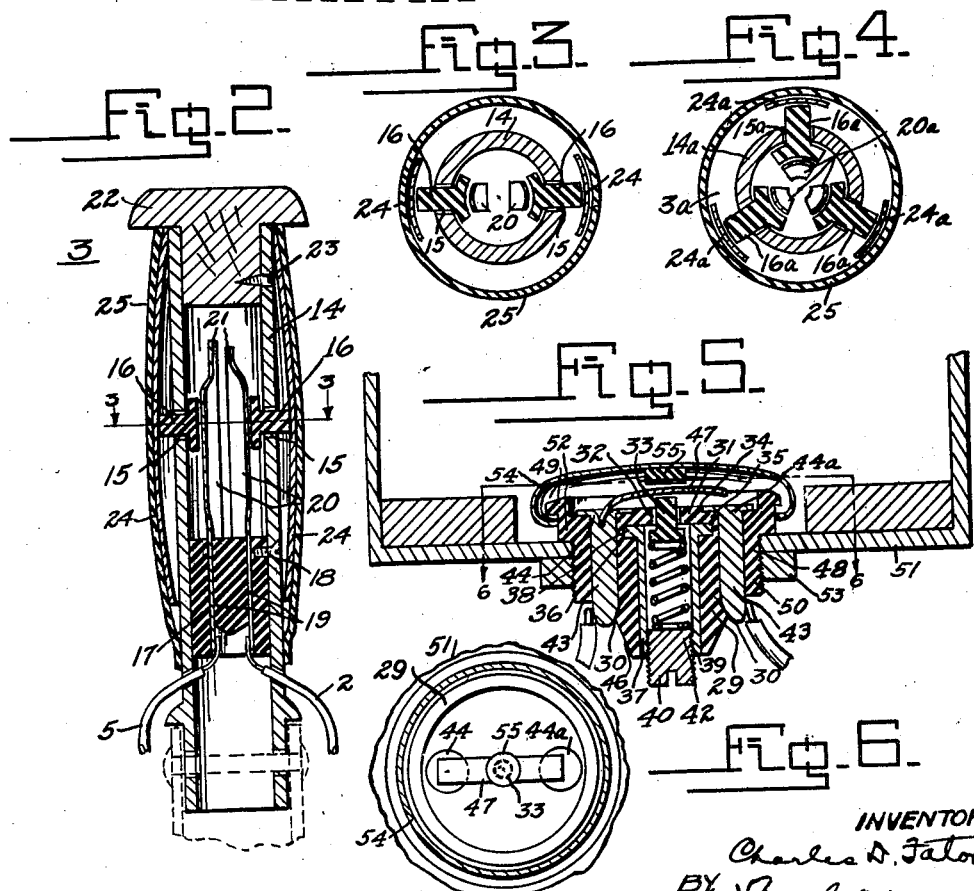
INVENTOR.
Charles D. Fator
BY
ATTORNEY.

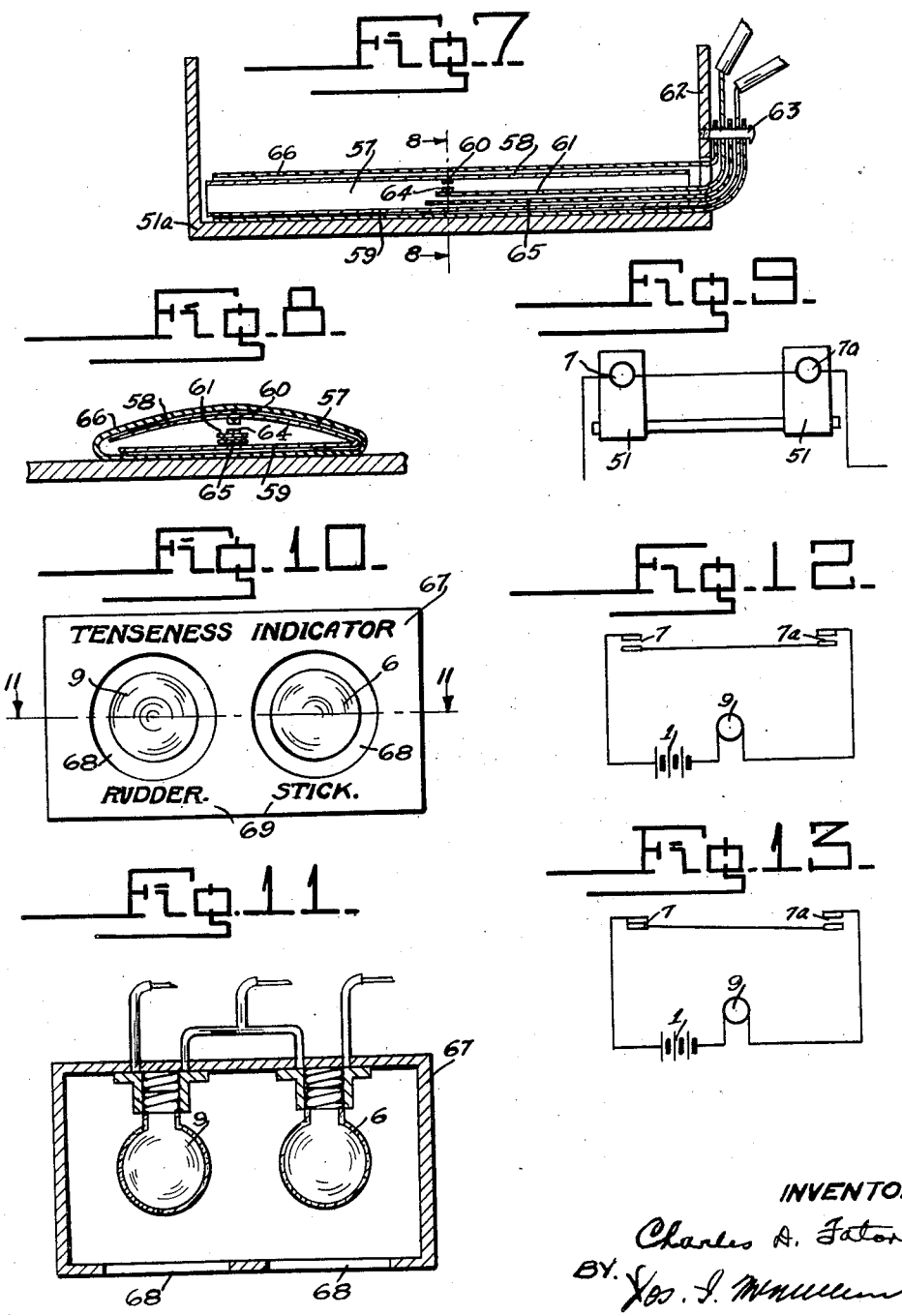

Patented July 23, 1935

2,008,693

UNITED STATES PATENT OFFICE 2,008,693

SIGNALING SYSTEM

Charles D. Fator, Wheeler Field, Honolulu, Territory of Hawaii

Application November 28, 1931, Serial No. 577,761

5 Claims. (Cl. 177—311)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to an improved signaling system to be employed on vehicles for determining the intensity under which the driver thereof operates the vehicle and more particularly it is directed to a signaling system of this character for use on aircraft.

One of the objects of this invention is to provide a signaling system for use on all manner of aircraft for indicating to an instructor the intensity under which a student pilot operates the aircraft thereby aiding the instructor in coaching the student pilot to relax on the controls of the aircraft and overcome the tendency to operate the controls with over-tenseness which prevents him from learning the "feel" of the controls.

Another object of this invention is to provide a signaling system for aircraft comprising electrical circuits having indicators and improved means contained in the electrical circuits for closing said circuits and operating the indicators when a predetermined excessive pressure is applied by a student pilot to the controls of the aircraft.

In the aviation service over-tenseness is a serious factor in the training of student pilots in operating the aircraft because in order that a student pilot of aircraft may become successful in the operation thereof he must learn to relax on the controls, that is, to use his muscles naturally and avoid over-straining and not take a death grip on the controls which usually is the case of the beginner. This is usually quite difficult for the beginner as he must be reminded quite often to relax. The sooner the student masters the art of relaxing the sooner he learns the "feel" of the controls necessary to learn to fly. Only excessive over-tenseness can be readily noticed by the instructor in the student so when the student is only slightly tensed-up he may plod along for some time, gradually lagging behind the other student pilots on account of the handicap of his tenseness.

Another fault of the beginner is to bear heavily on the rudder control pedals with both feet. This naturally precludes the possibility of the student pilot ever developing the "feel" of the rudder controls.

It is therefore the aim and purpose of this invention to provide an improved signaling system for aircraft comprising electrical circuits, improved electric contacting devices and indicating devices contained in the electrical circuits. One of the improved contacting devices being mounted on the control stick of the aircraft while other contacting devices are mounted on the rudder control pedals thereof. The contacting device on the control stick when gripped by a predetermined excessive pressure by the hand in the case when a student pilot or driver is over-tense causes one of the circuits to be closed and operate a grip indicating device. Each rudder control pedal of the aircraft contains one of my improved rudder control contacting devices which are operated for closing another circuit when both pedals are operated with too great a pressure for operating a rudder control indicating device when the student pilot exerts a more or less predetermined excessive pressure with his feet on the rudder control pedals thereby immediately indicating to an instructor that the student is tensed-up and exerting too great a pressure on the rudder control pedals.

With the above and other objects and advantages in view the invention specifically consists in features of construction, arrangement, and operation of parts which will hereinafter appear. For purposes of illustration the invention will be described and claimed with reference to the accompanying drawings in which like numbers distinguish like parts and in which:

Fig. 1 is a diagrammatic view of circuits and apparatus embodying this invention applied on an aircraft.

Fig. 2 is an enlarged vertical cross-sectional view of my improved electric contact gripping device applied to the control stick of an aircraft.

Fig. 3 is a cross-sectional view thereof taken on line 3—3 of Fig. 2.

Fig. 4 is a cross-sectional view of a modified form of contact gripping mechanism.

Fig. 5 is an enlarged vertical cross-sectional view of my improved rudder control contacting device and rudder control pedal to which the contacting device is applied.

Fig. 6 is a cross-sectional view of the rudder control pedal and my improved electric contacting device taken on line 6—6 of Fig. 5

Fig. 7 is a vertical cross-sectional view of a modified form of my improved electric contactting device applied to a rudder control pedal.

Fig. 8 is a cross-sectional view thereof taken on line 8—8 of Fig. 7.

Fig. 9 is a front plan view of the rudder control pedals of an airplane equipped with my improved contacting devices.

Fig. 10 is an enlarged front elevation of a housing for the indicators used in carrying out the invention.

Fig. 11 is a cross-sectional view taken on line 11—11 of Fig. 10.

Fig. 12 is a diagrammatic view of the electric circuit for the rudder control pedal contacting devices illustrating the open condition of the electric circuit when the contacting devices are in normal position.

Fig. 13 is a diagrammatic view of the electric circuit for the control pedal contacting devices illustrating the condition of the circuit when an excessive pressure has been applied to one of the rudder control pedals of aircraft containing my improved contacting device.

In carrying out my invention I use an electric signaling control system generally indicated by A comprising electric circuits which are fed by a high D. C. potential source 1 which is shown as a battery but any other suitable source may be employed such as a small generator. One end of the source 1 which for the purpose of illustration will be designated the positive side thereof is directly connected by conductor 2 to my improved contact gripping device 3 which is suitably connected to the upper end of the control stick 4 in the cockpit C of the student pilot of the aircraft B. The other side of the contact gripping device 3 is connected by conductor 5 to one side of a gripping indicator 6 in the cockpit D for the instructor. The grip indicator 6 in the present instance is shown as a lamp but any other suitable visual or audible indicating device may be employed. The other side of the grip indicator 6 is connected to the other end of source 1. The positive side of source 1 is also connected to one side of the contacting device 7 of my improved rudder control contacting devices 7 and 7a which will hereinafter be described more in detail. The other side of the rudder control contacting device 7 is connected to one side of the other improved rudder control contacting device 7a. The other side of the rudder control contact device 7a is connected by the conductor 8 to one side of my rudder control indicating device 9 adjacent the grip indicating device 6 for the instructor. The other side of the indicating device 9 is connected to the negative side of the source 1 through the negative side of the grip indicating device 6.

To provide similar electric contact gripping and rudder control indicating devices for the student pilot the negative side of the source 1 is directly connected to one side of the control switch 10 in the instructor's compartment D by conductor 11, the other side of which is directly connected to one side of a contact gripping device 12 and to one side of a rudder control indicating device 13 in the student's compartment B. The other side of the rudder control indicating device 13 is connected to conductor 8. The switch 10 in the instructor's compartment when thrown in thus connects the signaling devices 12 and 13 of the student in parallel with those in the instructor's compartment so that the student as well as the instructor may see when the student is pressing on the controls too hard.

The contact gripping device 3 which I use for closing the circuits for operating the grip indicators 6 and 12 of the instructor and student pilot respectively when a predetermined excessive pressure is applied to the gripping device 3 by the hand of the student pilot is illustrated in Figs. 2, 3, and 4 of the drawings and comprises a longitudinally extending cylindrical casing 14 having transverse aligned apertures 15 intermediate the ends thereof in which the plunger buttons 16 are movably mounted. These plunger buttons 16 are made of any suitable insulating material such as porcelain or hard rubber. Near the lower end of the casing 14 and in the interior thereof is a cylindrical plug 17 made of any suitable insulating material such as bakelite which is rigidly connected to the casing 14 by any suitable means such as by screw 18. The plug 17 is provided for holding the lower ends 19 of resilient contacting member 20 and insulating the same from each other, the free ends of the contact members 20 project longitudinally upward in the cylindrical casing 14 and terminate in inwardly bent ends 21 to provide contact points for the resilient contact members 20. The upper end of the casing 14 is closed by a removable cap 22 made of any desirable material such as wood which is connected to the casing 19 by any suitable means such as by screw 23.

Mounted on the exterior of the casing 14 are metallic spring arms 24 which lie adjacent the outer ends of the plunger buttons 16. These spring arms 24 are shaped to correspond to the general form of the casing 14 and have their upper ends rigidly secured to the upper end of casing 14 while at their lower ends they are free to slide up and down on the casing 14 when the gripping device 3 is gripped and operated by the hand. Surrounding the whole grip assembly is a cover 25 made of any suitable material such as live springy rubber. Connected to the lower end of the resilient contacting members 20 are ends of electric conductors 2 and 5 of the circuit in which the gripping device 3 is inserted.

A modification of the contact gripping device 3 illustrated in Fig. 4 of the drawings is similar to the one illustrated in Fig. 2 thereof and described above except a trio of push buttons 16a together with resilient contact members 20a and spring arms 24a are used which are equally spaced around the cylindrical casing 14a having the apertures 15a in which the push buttons 16a are mounted. One of the resilient contact members 20a is electrically neutral and insulated from the other two contact members 20a. Said neutral contact 20a contacts with the other contacts 20a to complete the circuit between them, this gives a more uniform result than the device shown in Figs. 2 and 3 of the drawings because of the increased number of contacts. All three buttons 16a if pressed in closes the circuit as would be the case when the gripping device 3a was gripped abnormally for operating the proper grip indicating device in that circuit.

To install my contact gripping device 3 on the control stick of an aircraft as an accessory, the old gripping portion would be sawed off just below the grip and my improved contact gripping device inserted and bolted or riveted thereon. For initial installation the gripping device 3 could be made as part of the stick, in which case the conductors therefor of the signaling circuit would pass down through the stick and out at the bottom instead of out above the point of attachment as shown in Fig. 2 of the drawings which illustrate the gripping device 3 used for accessary installation.

My improved electric rudder control contacting devices 7 and 7a which I employ in the electric system for causing the rudder control indicators 9 of the instructor and the indicator 13 of the student pilot to be operated when a predetermined excessive pressure is applied to the rudder control pedals of the aircraft is illustrated in Figs. 5 and 6 of the drawings and comprises a casing 29 made preferably of hard rubber having side walls 30 and an integral top portion 31 containing a centrally located opening 32 in which a plunger button 33 of insulating material is movably mounted. The top portion 31 of the casing 29 is also provided with a circumferential cut-out portion 34 providing a shoulder 35. A circumferential groove 36 is formed within the side walls 30 of the casing 29 adjacent the top portion 31 thereof. Imbedded within the casing 29 is a metallic bushing 37 having a flared upper end 38 which is positioned within the internally formed groove 36 of the casing 29 and having an internally threaded end 39 to which a plunger screw 40 having a screw driver slot is threadedly connected. A coil spring 42 is positioned within the bushing 37 the outer ends of which are adapted to abut against the plunger button 33 and screw 40. The plunger screw 40 is adapted to adjust the tension of the spring 42 and normally hold the plunger button 33 in an upward position and permit the same to be pushed inwardly against the tension of the spring for operating the contacting device.

On each side of the casing 29 are electrical terminal plates 43 having flared upper ends 44 and 44a which abut against a shoulder 35 of the casing 29. These terminal plates 43 extend downwardly to the beveled end 46 of the casing 29. One end of a spring contacting arm 47 is embedded in the upper end of one of the terminal plates 43 which is provided with a recess for allowing free movement of the spring at the bend thereof. Surrounding the contacting assembly is a bushing member 48 having a flared upper end 49 and an externally threaded contacting end 50 which is adapted to be inserted in an opening formed in the rudder control pedal 51, the shoulder 52 of the bushing 48 resting against the upper surface of the pedal 51 and held in place thereon by the lock nut 53. The lower end of the bushing member 48 terminates just short of the lower end of the terminal plates 43 to which the ends or electric conductors are connected. Mounted on the assembly is a dome shaped cap 54 made of suitable resilient material having the edges thereof bent under and inwardly to slidably lock under the flared upper end 49 of the upper end of the bushing member 48. A piece of insulating material 55 is provided which may be suitably connected to the cap 54 as shown or to the spring contacting arm 47 for aiding the cap 54 in pressing the arm 47 inwardly against the push button 33 for causing the free end of the spring arm 47 to electrically contact with the upper end 43a of the other terminal plate 43. The spring 42 normally holding the push button 33 against the contact arm 47 to hold it in an inoperative position.

A modification of the rudder control electric contacting device is illustrated in Figs. 7 and 8 of the drawings, this modification has no spring adjustment as the tension of the spring is fixed. It comprises a metallic spring casing 57 which is bent upon itself to form upper and lower portions 58 and 59 respectively. The lower portion 59 forms the base of the device and is shaped to fit the contour of the face of the rudder control pedal 51A, the upper portion 58 thereof is shaped as shown in the drawings. The free ends of the casing 57 being separated from each other to provide a gap for permitting spring movement thereof. The casing 57 is of the proper weight to bend with a pressure slightly more than the normal weight of the leg and foot, the upper portion 58 thereof bending only when a predetermined excessive pressure is applied thereto by the foot. An electric contact point 60 is provided on the lower surface of the upper portion 58 intermediate the ends thereof. Longitudinally positioned within the spring casing 57 is a spring arm 61 having its outer end projecting out through a common opening formed in side flange 62 of the pedal and attached to the outside of the control pedal 51A by means of a common bolt 63. On the inner end of arm 61 and on the upper surface thereof adjacent the contact point 60 is a contact point 64. The spring arm 61 is insulated from the lower portion 59 of the casing 57 by means of a parallel arm 65 made of any suitable insulating material. The outer end of arm 65 is also bent upwardly and connected to the bolt 63. To protect and insulate the contact mechanism the whole assembly is covered by a sleeve of suitable insulating material 66 which conforms to the shape of the spring casing 57 having its outer end bent upwardly to connect with the bolt 63. Connected to the outer end of the lower portion 59 of the casing 57 and to the outer end of the spring arm 61 are electric conductors of the electrical system used in carrying out the invention.

It will readily be seen from the above description of the contacting device by any one skilled in the art that when a predetermined excessive pressure is applied to the spring casing 57 by the foot of the student pilot that the upper portion 68 thereof will bend downwardly and cause the electric contact point 60 thereof to come in contact with the electric contact point 64 provided on the spring arm 61 thereby closing the electric circuit between the spring arm 61 and metallic spring casing 57.

The indicators 6 and 9 of the instructor may be inclosed in a shallow box 67 having apertures 68 and which may be provided with a dial as illustrated in Figs. 10 and 11 of the drawings. The shallow box 67 may be mounted on the instrument board of the instructor.

A similar box may also be used for inclosing the indicators 12 and 13 of the student pilot which may be mounted on any suitable place of the aircraft where it will be in line of the vision of the student such as on the cowling thereof.

The indicating devices may consist of lamps as illustrated and may be of different colors to indicate to the instructor or student whether the rudder control pedals have been operated with too great a pressure or the control stick gripped too hard. Besides the different colored lamps an index 69 may be placed below the lamps, so that when the lamps are operated there will be no mistake about which signal has been operated.

It will thus be seen that this invention provides a highly novel, simple and efficient form of signaling system that is well adapted for all the purposes designated. Even though there is herein shown and described my invention as comprising certain features of construction, arrangement, and operation it is nevertheless to be understood that changes may be made therein without departing from the spirit or scope of my invention, which broadly comprises an electrical system for indicating excess pressure on the controls of airplanes by students; including a pressure control switch on the hand control of said aircraft and pressure control switches on the pedal controls thereof, a source of electric potential connected to said switches; and signal means and a compartment remote from said controls, said signal means connected between said source of potential and said switches, another duplicate set of said signal means adjacent said controls, and circuit means including a switch in said remote compartment connecting said second signal means in shunt with said first signal means.

A grip control switch in the form of a handle comprising spring pressed contact points having terminals, grip actuated depressing means comprising buttons and resilient hand gripping means engaging said buttons, said buttons engaging said spring pressed contact points, and a foot actuated switch comprising a casing having spaced conductors thereon with terminals attached thereto, a spring conductor means connected to one of said conductors and resiliently held out of contact from the other conductor by means of a spring pressed button, in combination with resilient depressable means for forcing said spring conductor means into contacting engagement with said second conductor is also comprised within the scope of the invention.

Now that I have disclosed my invention what I claim as new and useful is:

1. Means for indicating excess pressure on a control member of a vehicle which is actuated by a body member of the operator of the vehicle, comprising a pressure operated switch on the control member at the point where the body member engages the control member, said switch being normally open and closed by predetermined excess pressure of the body member, a source of potential, and signal means connected in circuit with said switch.

2. A system for indicating excess gripping pressure on the hand control member of a vehicle which is actuated by the hand of the operator of the vehicle, comprising a pressure operated switch on the hand control member at the point where the hand engages the control member, said switch being normally open and closed by predetermined excess pressure of the hand, a source of electric potential and signal means connected in circuit with said switch.

3. A system for indicating excess pressure on the foot control of a vehicle which is actuated by the foot of the operator of the vehicle, comprising a pressure operated switch on the foot control at the point where the foot engages the control member, said switch being normally open and closed by predetermined excess pressure of the foot, a source of electric potential and signal means connected in circuit with said switch.

4. A system for indicating excess pressure on the controls of an airplane by students, which are actuated by body members of the operator of the airplane, comprising a pressure operated switch on the hand control of said aircraft, a pressure operated switch on the foot control thereof, said switches located at the point on said hand and foot control where said body members engage the said controls, said switches being normally open and closed by predetermined excess pressure of the body members, a source of electric potential connected to said switches and signal means connected between source of potential and said switches.

5. A system for indicating excess pressure on the controls of an airplane by students which are actuated by body members of the operator of the airplane, comprising a pressure operated switch on the hand control of said aircraft and pressure control switches on the pedal control thereof, said switches of said hand and pedal controls located at the point where said body members engage the said controls, said switches being normally open and closed by predetermined excess pressure of the body members, a source of electric potential connected to said switches and signal means connected between said source of potential and said switches, said signal means being located in the instructor's compartment, a duplicate set of said signal means adjacent said controls, and circuit means including a switch connecting said second signal means in shunt with said first signal means.

CHARLES D. FATOR.